United States Patent
Daniel

[15] 3,667,610
[45] June 6, 1972

[54] APPARATUS FOR COLLECTING OIL FROM THE SURFACE OF A BODY OF WATER

[72] Inventor: William H. Daniel, Route 3, Rogers, Ark. 72756

[22] Filed: Feb. 8, 1971

[21] Appl. No.: 113,254

[52] U.S. Cl. .....................................210/242, 210/DIG. 21
[51] Int. Cl. .........................................................C02b 9/02
[58] Field of Search...................299/9; 210/83, 242, DIG. 21

[56] References Cited

UNITED STATES PATENTS 3,500,841   3/1970   Logan..............................210/DIG. 21

*Primary Examiner*—Reuben Friedman
*Assistant Examiner*—T. A. Granger
*Attorney*—Young & Thompson

[57] ABSTRACT

Oil is collected from the surface of a body of water by immersing a tent-shaped collector from above the surface of the water to a depth such that the hydrostatic pressure of the oil in the collector will pump oil to an elevation above the surface of the water and into a collection receptacle. The collector slides vertically on a conduit and delivers the oil into the lower end of the conduit, the lower end of the conduit being positioned at a depth which determines the height to which the oil can be pumped above the surface of the water.

8 Claims, 7 Drawing Figures

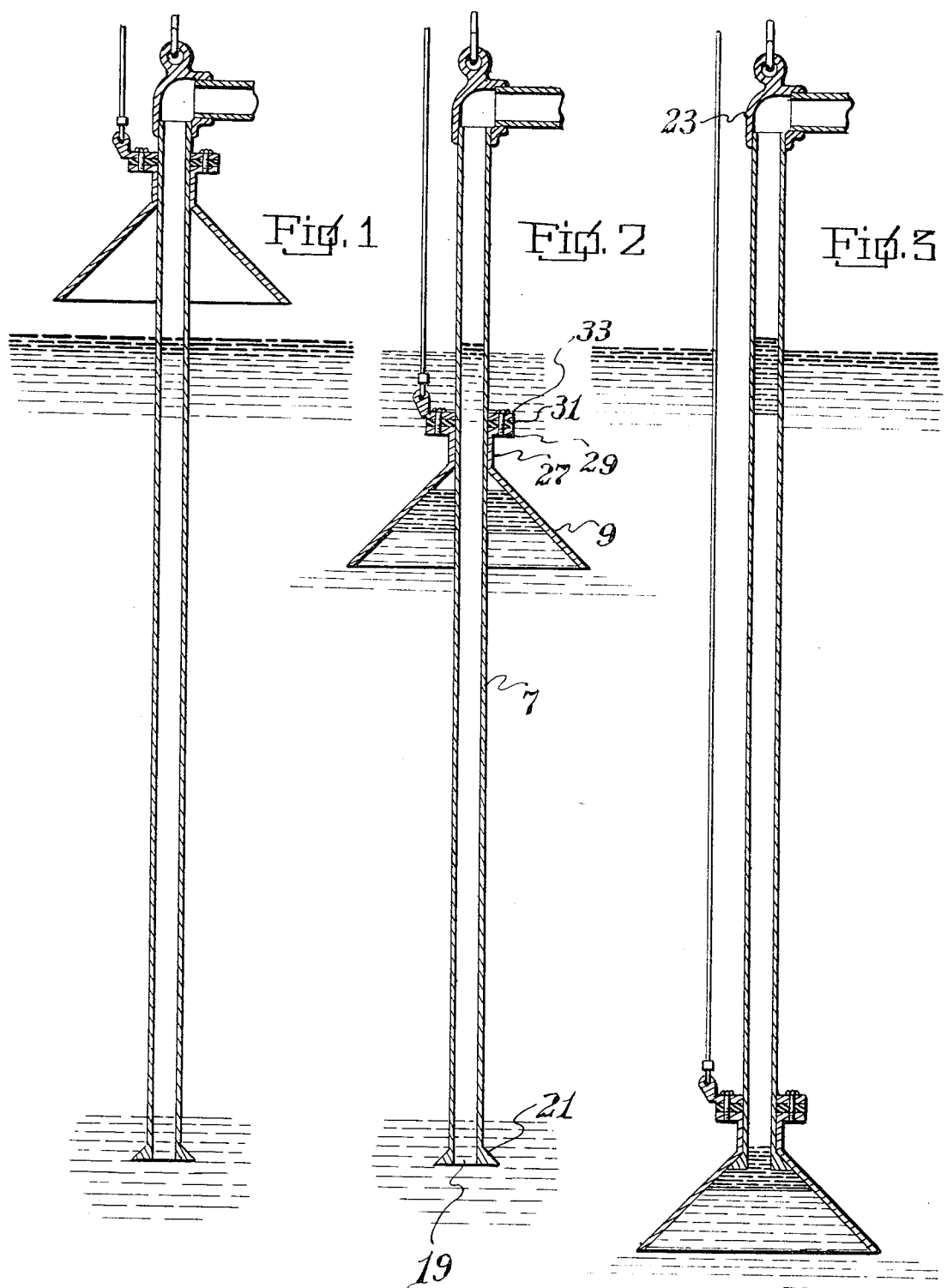

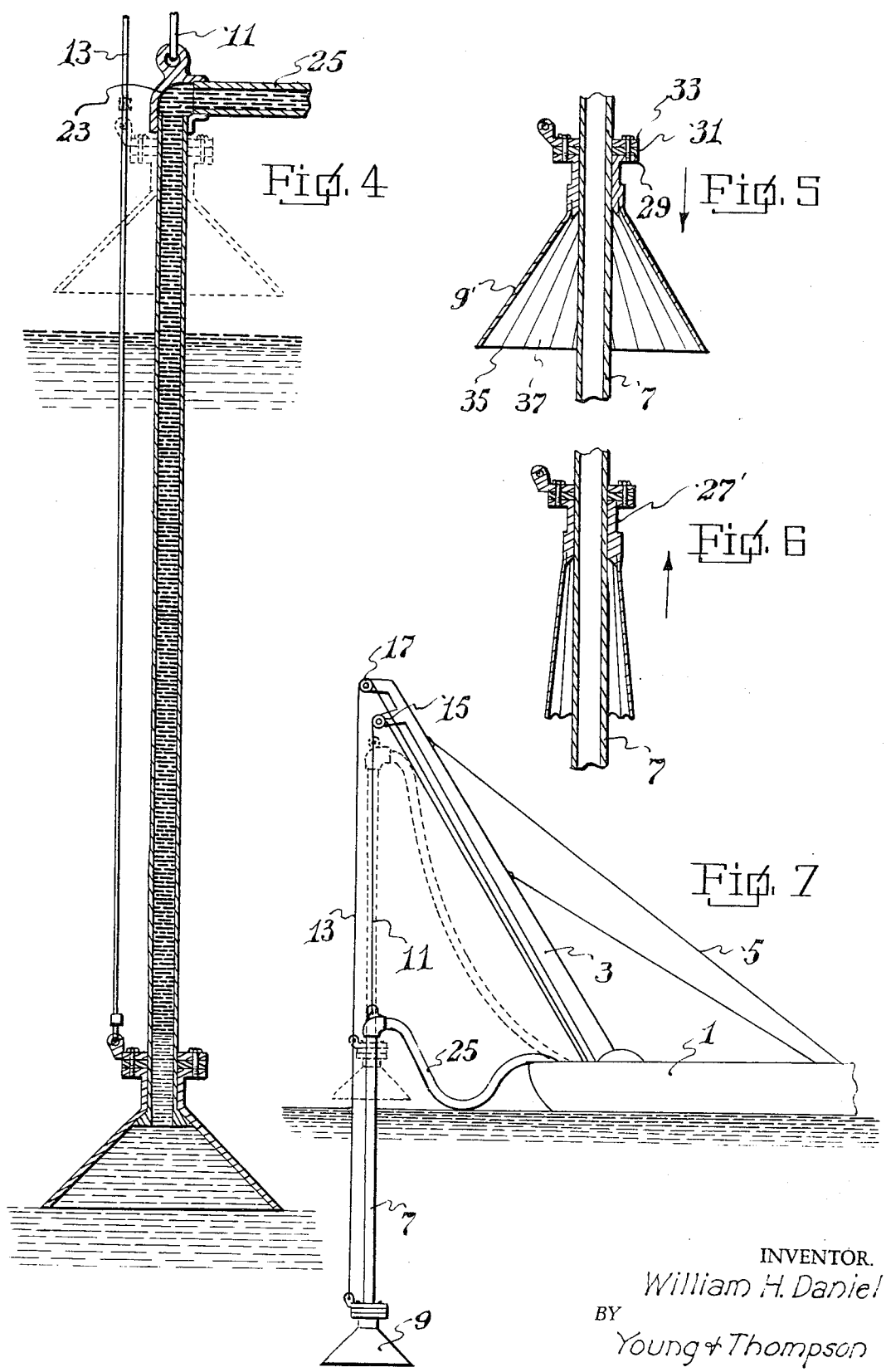

APPARATUS FOR COLLECTING OIL FROM THE SURFACE OF A BODY OF WATER

The present invention relates to apparatus for collecting oil from the surface of a body of water, more particularly of the type in which oil spills are cleaned up by effecting a water-oil separation and removing the oil.

When oil spills on or in a body of water, it tends to form a large slick which is a more or less thin layer of oil floating on the water. To clean up the oil slick, it is necessary to remove the oil from the surface of the water, and this of course can be attempted in many ways. At present, removal by mechanical collection seems to be the most feasible method.

A number of proposals have been made of ways to skim oil from water. These skimming procedures for the most part rely on confining and removing laterally in a horizontal direction oil from the water, thereby to accumulate a body of oil of a depth greater than the depth assumed by the unconfined oil.

In fact, however, the water on which oil slicks occur is often wave tossed, and the layer of oil on water is accordingly not flat. Thus, the most effective skimming devices so far have been confronted with the serious problem that, under actual conditions, what is actually skimmed is more air and water than oil.

The present invention constitutes a radical departure from oil-skimming techniques known heretofore and operates according to principles never before used by anyone other than the present inventor, in the collection of oil from the surface of a body of water. In particular, the present invention collects oil from the surface of the water, regardless of the contour or wave motion of the water, not by moving the oil in a horizontal direction relative to the water but rather by moving the oil downwardly beneath the surface of the water, and then upwardly. Having regard for the differential specific gravities of oil and water, the downward movement of the oil beneath the surface of the water imparts to the oil the ability to perform the work of elevating the separated oil a substantial distance above the surface of the water, that distance of course varying according to the depth to which the oil is sunk before it is permitted to rise.

Accordingly, it is an object of the present invention to provide apparatus for collecting oil from the surface of a body of water, which operates well in rough water.

Another object of the present invention is the provision of such an apparatus, which uses hydrostatic pressure to pump the oil to an elevation a substantial distance above the surface of the water.

Finally, it is an object of the present invention to provide such an apparatus which will be relatively simple and inexpensive to manufacture, easy to operate, maintain and repair, and rugged and durable in use.

Briefly, and very broadly, according to the present invention, a tent-like structure is immersed from a position above the surface of the water to a position below the surface of the water thereby confining and forcing downwardly an area of oil on the surface of the water, to a depth lower than would otherwise be assumed by the relatively buoyant oil. The area of the submerged oil patch is then decreased by the tendency of the oil to move to the top of the tent-like structure, and the oil thus concentrated is permitted to flow into the lower portion of a vertical conduit, in which it tends to flow upwardly under hydrostatic pressure. The tent-like structure is repeatedly raised and lowered, thereby repeatedly introducing oil into the conduit, so that the liquid in the conduit rises to a height above the surface of the surrounding water such that the total weight of the liquid in the conduit is no greater than the weight of an identical column of water alone whose height is no greater than the depth of submergence of the conduit. Oil thus flowing from the upper end of the conduit is collected and maintained separate from the body of water.

Other objects, features and advantages of the present invention will become apparent from a consideration of the following description, taken in connection with the accompanying drawings, in which:

FIG. 1 is a cross-sectional elevational view of apparatus according to the present invention, at a first stage of operation in which the tent-like structure is poised above the surface of the water;

FIG. 2 is a view similar to FIG. 1, but showing the tent-like structure lowered;

FIG. 3 is a view similar to FIGS. 1 and 2 but showing the next sequential situation in which the tent-like structure is at its lowermost position;

FIG. 4 is like FIG. 3 but shows the liquid level in the apparatus after a number of charges of oil have been introduced into the conduit;

FIGS. 5 and 6 show fragments of the preceding structure in which is illustrated a modified form of tent-like structure which is collapsible; and FIG. 7 is an elevational view of a ship or barge equipped with the present invention for the collection of oil from the surface of a body of water.

Referring now to the drawings in greater detail, and first to the overall view of FIG. 7, there is shown apparatus according to the present invention, comprising a ship or barge 1 that is adapted to move across the surface of a body of water on which the oil spill occurs, to the site of the oil spill, and to carry the rest of the apparatus according to the present invention and to receive and retain the collected oil. Ship 1 carries a boom 3 vertically and horizontally swingable thereon and adjustably supported by guy lines 5, from which the collecting apparatus of the present invention is suspended.

The collecting apparatus itself comprises principally a vertical cylindrical conduit of steel pipe or the like in the form of a hollow stem 7 with a tent in the form of a cone 9 encircling it and vertically slidable thereon. Cables 11 and 13 support stem 7 and cone 9, respectively, for vertical movement conjointly with and relative to each other, the cable 11 being reeved over a sheave 15 carried by boom 3 and the cable 13 being reeved over a sheave 17 carried by boom 3. Winches (not shown) mounted on ship 1 individually and/or jointly reel in or pay out cables 11 and 13.

At its lower end, stem 7 has an opening 19 surrounded by an enlargement in the form of a stop 21 having a conical upper surface. At its upper end, stem 7 is secured to a union 23 to which cable 11 is secured and by which stem 7 is connected in fluid communication with a flexible tube 25 that extends from the upper end of stem 7 to the storage chambers (not shown) for collected oil on ship 1.

Cone 9 slides up and down on and relative to stem 7 and is retained at the lower end of stem 7 by stop 21, whose conical upper surface matches the conical under surface of cone 9. Cone 9 in turn extends upwardly in the form of a cylindrical sleeve 27 which slidably guides cone 9 on stem 7. Sleeve 27 terminates upwardly in a radially outwardly extending horizontal flange 29 that provides one of the two seats for a packing 31 that is releasably compressed between flange 29 and a superposed ring 33 to which cable 13 is secured. When flange 29 and ring 33 are tightened together, packing 31 is in slidable sealing relation with stem 7 so as to permit the escape of air but substantially to prevent the leakage of oil upwardly between cone 9 and stem 7.

In the embodiment of FIGS. 1-4, cone 9 is rigid. However, as shown in FIGS. 5 and 6, it is possible also to make cone 9 deformable in the manner of an umbrella. To this end, cone 9' in the embodiment of FIGS. 5 and 6 is in the form of a plurality of ribs 35 resiliently secured at their upper ends to sleeve 27' and interconnected by a flexible material 37 which is both waterproof and oilproof, such as synthetic rubber or the like. The cone 9' of the embodiment of FIGS. 5 and 6 thus offers less water resistance upon upward movement, as seen in FIG. 6.

In operation, ship 1 is moved to the site of an oil spill or other accumulation of oil on the surface of a body of water, of course with stem 7 elevated. When in the midst of the oil spill, stem 7 is lowered into the water and immerses by its own weight, to the FIG. 1 position. Then, with boom 3 and cable 11 held stationary, cable 13 is paid out to immerse cone 9 by its own weight from the FIG. 1 position successively through the FIG. 2 position to the FIG. 3 position. When cone 9 enters the water from above, it confines within its periphery a circular or annular layer of oil, which tends to consolidate laterally and increase in vertical height as the entrapped air leaks out past packing 31 (see FIG. 2). Cone 9 continues downward to the FIG. 3 position, where the oil can then flow into the opening 19 at the lower end of stem 7. Because oil is lighter than water, the oil does so and is forced by hydrostatic pressure upwardly in stem 7, so that initially, a plug of oil forms adjacent the upper end of the interior of stem 7, as shown near the water level in FIG. 3.

This plug of oil will be lighter than water and hence its upper surface will be somewhat above the surface of the surrounding water level. Cone 9 is then raised again to the FIG. 1 position, and lowered again, to introduce a second plug of oil into the lower end of stem 7, which second plug rises and joins the first, the upper surface of the oil within stem 7 rising still higher.

After a number of such operations, the level of oil within stem 7 has risen to the level of and filled the union 23, after which oil flows through tube 25 to storage as quantities of oil are successively introduced into the lower end of stem 7. In effect, it is the buoyancy of the collected oil, immersed to a suitable depth, that pumps previously collected oil by hydrostatic pressure to any desired elevation, dependent on how deeply opening 19 is immersed. Thus, if it is desired to pump oil higher, opening 19 is immersed deeper, the height of the column of liquid within stem 7 being such that the weight of liquid within stem 7, above and below the surface of the surrounding water, is no greater than the height of a column of water alone of similar cross-sectional area and of a height equal to the depth of immersion of opening 19.

As is apparent from a comparison of FIGS. 5 and 6, the resistance to upward movement of cone 9 through the water can be reduced and the work of raising cone 9 correspondingly reduced, by making cone 9 resiliently collapsible in the manner described, so that cone 9' at least partially collapses during upward movement and then springs back open for downward movement.

It goes without saying that the oil-water separation of the present invention will not be perfect. Some water will be carried up in stem 7, and some air will be entrained. Any such agitation as in the present invention will inevitably have a corresponding tendency, no matter how slight, to form some oil-air froth or oil-water-air froth. But the entrainment of air is of course balanced by the entrainment of water; and in any event, water and air will separate from the oil by gravity on the ship, so that these tendencies are not troublesome. Also, union 23 can be provided with an upwardly extending air bleed vent to reduce the amount of air that is carried over into tube 25.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for collecting oil from the surface of a body of water, comprising a tent, an upright conduit immersible in the water, the tent surrounding and sliding on the upright conduit, the conduit having an opening adjacent its lower end for receiving oil from the tent, and means to slide the tent vertically on and relative to the conduit from a position above the surface of the water to a position adjacent the lower end of the conduit whereby in said latter position oil collecting in an upper portion of the tent flows into said opening and up through said conduit.

2. Apparatus as claimed in claim 1, said conduit being rigid, and flexible conduit means for removing oil from an upper portion of said rigid conduit.

3. Apparatus as claimed in claim 1, and stop means adjacent the lower end of the conduit to predetermine the lowermost position of the tent on the conduit.

4. Apparatus as claimed in claim 1, and means partially sealing between the tent and the conduit to permit escape of air from an upper portion of the tent when the tent is submerged but substantially to prevent the escape of oil upwardly from the tent between the tent and the conduit.

5. Apparatus as claimed in claim 1, said tent being in the form of a downwardly opening cone and terminating upwardly in a vertical sleeve that slidably surrounds said conduit.

6. Apparatus as claimed in claim 5, and a radially outwardly extending flange at the upper end of said sleeve, and packing means carried by said flange for partially sealing against the outer surface of said conduit to permit the escape of air from the upper portion of said cone but substantially to prevent the escape of oil from between said cone and said conduit.

7. Apparatus as claimed in claim 5, said cone being rigid.

8. Apparatus as claimed in claim 5, said cone comprising a plurality of ribs resiliently urged outwardly and interconnected by flexible material.

* * * * *